(12) United States Patent
Kitao

(10) Patent No.: US 10,178,687 B2
(45) Date of Patent: Jan. 8, 2019

(54) COMMUNICATION DEVICE, ELECTRONIC DEVICE, RADIO WAVE SETTING METHOD

(71) Applicant: KYOCERA Document Solutions Inc., Osaka-shi, Osaka (JP)

(72) Inventor: Tomoyuki Kitao, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/571,487

(22) PCT Filed: Jun. 15, 2016

(86) PCT No.: PCT/JP2016/067800
§ 371 (c)(1),
(2) Date: Nov. 2, 2017

(87) PCT Pub. No.: WO2016/204177
PCT Pub. Date: Dec. 22, 2016

(65) Prior Publication Data
US 2018/0139771 A1 May 17, 2018

(30) Foreign Application Priority Data
Jun. 19, 2015 (JP) .................................. 2015-123955

(51) Int. Cl.
*H04W 72/12* (2009.01)
*H04B 1/04* (2006.01)
(Continued)

(52) U.S. Cl.
CPC ...... *H04W 72/1257* (2013.01); *G06F 3/1236* (2013.01); *G06F 3/1286* (2013.01); *G06F 3/1292* (2013.01); *H04B 1/04* (2013.01); *H04B 1/38* (2013.01); *H04M 1/00* (2013.01); *H04W 8/22* (2013.01); *H04W 48/04* (2013.01); *H04W 72/1294* (2013.01); *H04W 72/14* (2013.01)

(58) Field of Classification Search
None
See application file for complete search history.

(56) References Cited

U.S. PATENT DOCUMENTS

| 2010/0316031 A1* | 12/2010 | Sasao | H04W 8/22 370/338 |
| 2011/0299461 A1* | 12/2011 | Nagara | H04W 48/16 370/328 |
| 2015/0103374 A1* | 4/2015 | Lee | H04N 1/00307 358/1.15 |

FOREIGN PATENT DOCUMENTS

JP 2004336638 A 11/2004

* cited by examiner

*Primary Examiner* — Andrew H Lam
(74) *Attorney, Agent, or Firm* — Alleman Hall Creasman & Tuttle LLP

(57) ABSTRACT

An image processing apparatus (10) includes: a connection processing portion (151) that establishes a communication connection with an electronic device (50) by using a specific radio wave for which a transmission condition is set in advance, the electronic device being capable of transmitting, to outside, country information that is registered in advance; an obtainment processing portion (152) that obtains the country information from the electronic device (50) with which the communication connection has been established by the connection processing portion (151); and a setting processing portion (153) that sets the transmission condition for a radio wave that is transmitted from a wireless communication portion (17), based on the country information obtained by the obtainment processing portion (152).

4 Claims, 3 Drawing Sheets

(51) Int. Cl.
*H04B 1/38* (2015.01)
*H04M 1/00* (2006.01)
*H04W 8/22* (2009.01)
*H04W 48/04* (2009.01)
*G06F 3/12* (2006.01)
*H04W 72/14* (2009.01)

COMMUNICATION DEVICE, ELECTRONIC DEVICE, RADIO WAVE SETTING METHOD

TECHNICAL FIELD

The present invention relates to a communication device, an electronic device including a communication device, and a radio wave setting method.

BACKGROUND ART

An electronic device such as a printer or a multifunction peripheral may include a communication device such as a communication interface that can execute a wireless data communication with an external electronic device such as a personal computer. Meanwhile, depending on the laws of the country in which the communication device is used, radio wave transmission condition, such as the frequency or the radio wave field intensity, may be restricted. In connection with this, there is known a communication device that can set the transmission condition for the radio wave transmitted from the communication device, based on positional information of the communication device obtained from a GPS satellite (see PTL 1).

CITATION LIST

Patent Literature

[PTL 1] Japanese Patent Application Publication No. 2004-336638

SUMMARY OF THE INVENTION

Problems to be Solved by the Invention

However, in a case where the GPS is used to obtain the positional information of the communication device, a receiver for receiving a signal from the GPS satellite is necessary. This makes the configuration of the communication device complicate.

The present invention has been made in view of such conventional circumstances, and it is an object of the present invention to provide a communication device, an electronic device, and a radio wave setting method for setting, with a simple configuration, the transmission condition for the radio wave transmitted from the communication device.

Solution to the Problems

A communication device according to an aspect of the present invention includes a connection processing portion, an obtainment processing portion, and a setting processing portion. The connection processing portion establishes a communication connection with a specific electronic device by using a specific radio wave for which a transmission condition is set in advance, the specific electronic device being capable of transmitting, to outside, country information that is registered in advance. The obtainment processing portion obtains the country information from the specific electronic device with which the communication connection has been established by the connection processing portion. The setting processing portion sets the transmission condition for a radio wave that is transmitted from the communication device, based on the country information obtained by the obtainment processing portion.

An electronic device according to another aspect of the present invention includes the communication device.

A radio wave setting method according to a further aspect of the present invention includes a first step, a second step, and a third step. The first step establishes a communication connection with a specific electronic device by using a specific radio wave for which a transmission condition is set in advance, the specific electronic device being capable of transmitting, to outside, country information that is registered in advance. The second step obtains the country information from the specific electronic device with which the communication connection has been established in the first step. The third step sets the transmission condition for a radio wave that is transmitted from a communication device, based on the country information obtained in the second step.

Advantageous Effects of the Invention

According to the present invention, it is possible to set, with a simple configuration, the transmission condition for the radio wave transmitted from the communication device.

DESCRIPTION OF EMBODIMENTS

The following describes an embodiment of the present invention with reference to the accompanying drawings for the understanding of the invention. It should be noted that the following embodiment is an example of a specific embodiment of the present invention and should not limit the technical scope of the present invention.

[Communication System 100]

Figure 1:
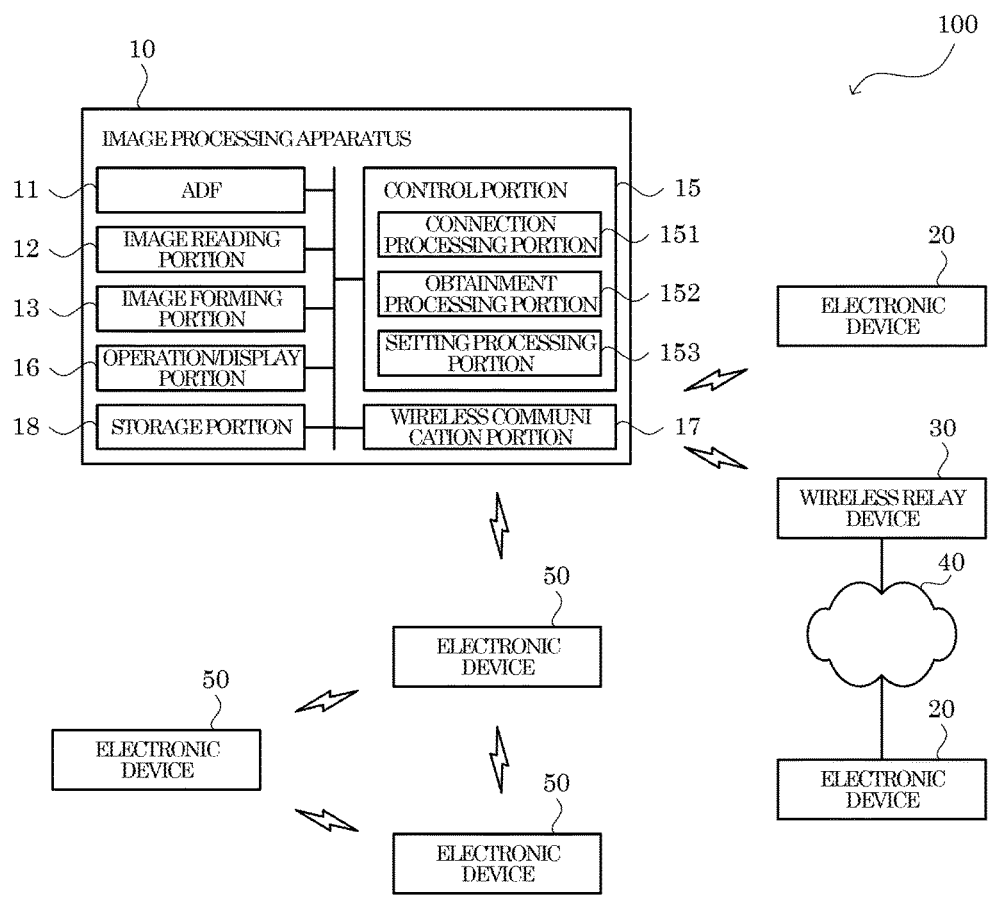
FIG. 1 is a block diagram showing a configuration of a communication system including an image processing apparatus according to an embodiment of the present invention.

As shown in FIG. 1, a communication system 100 that includes an image processing apparatus 10 according to an embodiment of the present invention, includes the image processing apparatus 10, a plurality of electronic devices 20, a wireless relay device 30, and a plurality of electronic devices 50. The electronic devices 20 are each an information processing apparatus such as a personal computer. The wireless relay device 30 is a communication device such as an access point. A part of the plurality of electronic devices 20 is connected to the wireless relay device 30 via a communication network 40. The electronic devices 50 are described below.

Upon being connected to the communication network 40 via the wireless relay device 30, the image processing apparatus 10 can execute a data communication with the electronic devices 20 via the communication network 40. In addition, the image processing apparatus 10 can execute a wireless data communication with the electronic devices 20 without via the wireless relay device 30.

[Outlined Configuration of Image Processing Apparatus 10]

Figure 2:
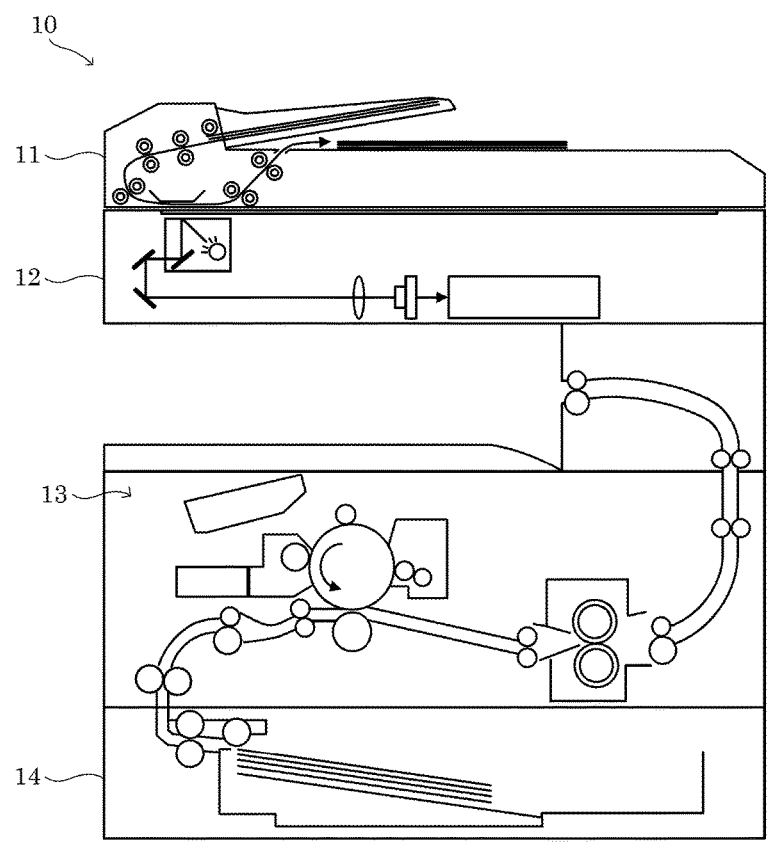
FIG. 2 is a diagram showing a configuration of the image processing apparatus according to the embodiment of the present invention.

The following describes an outlined configuration of the image processing apparatus 10 according to the embodiment of the present invention with reference to FIG. 1 and FIG. 2. Here, FIG. 2 is a schematic cross-sectional diagram showing the configuration of the image processing apparatus 10.

The image processing apparatus 10 is a multifunction peripheral having a plurality of functions such as: a scan function for reading image data from a document sheet; a print function for forming an image based on image data; a facsimile function; and a copy function. Here, the image processing apparatus 10 is an example of the electronic device of the present invention. It is noted that the present invention is applicable to electronic devices such as a scanner device, a printer device, a facsimile device, a copier, a personal computer, a smartphone, a tablet terminal, a television, and an air conditioner.

Specifically, as shown in FIG. 1 and FIG. 2, the image processing apparatus 10 includes an ADF (Auto Document Feeder) 11, an image reading portion 12, an image forming portion 13, a sheet feed portion 14, a control portion 15, an operation/display portion 16, a wireless communication portion 17, and a storage portion 18. Here, a device including the control portion 15 and the wireless communication portion 17 is an example of the communication device of the present invention.

The ADF 1 includes a document sheet setting portion, a plurality of conveyance rollers, a document sheet pressing, and a sheet discharge portion, and conveys a document sheet so that it is read by the image reading portion 12. The image reading portion 12 includes a document sheet table, a light source, a plurality of mirrors, an optical lens, and a CCD, and is configured to read image data from a document sheet.

The image forming portion 13 is configured to form an image by the electrophotography based on image data read by the image reading portion 12 or based on image data input from an external information processing apparatus such as the electronic devices 20. Specifically, the image forming portion 13 includes a photoconductor drum, a charging device, a laser scanning device, a developing device, a transfer roller, a cleaning device, a fixing roller, a pressure roller, and a sheet discharge portion. In the image forming portion 13, an image is formed on a sheet supplied from the sheet feed portion 14, and the sheet with the image formed thereon is discharged to the sheet discharge portion.

The control portion 15 includes electronic parts such as a CPU, a ROM, and a RAM that are not shown. The CPU is a processor that executes various calculation processes. The ROM is a nonvolatile storage device in which various information such as control programs for causing the CPU to execute various processes are stored in advance. The RAM is a volatile storage device that is used as a temporary storage memory (working area) for the various processes executed by the CPU. In the control portion 15, the CPU executes the various control programs stored in advance in the ROM. This allows the image processing apparatus 10 to be controlled comprehensively by the control portion 15. It is noted that the control portion 15 may be formed as an electronic circuit such as an integrated circuit (ASIC), and may be a control portion provided independently of a main control portion that comprehensively controls the image processing apparatus 10.

The operation/display portion 16 includes a display portion and an operation portion. The display portion is, for example, a liquid crystal display and displays various types of information based on control instructions from the control portion 15. The operation portion is composed of, for example, operation keys or a touch panel through which various types of information are input to the control portion 15 based on user operations.

The wireless communication portion 17 is a communication interface that can execute a wireless data communication with external communication apparatuses. For example, the wireless communication portion 17 can execute a wireless communication with the wireless relay device 30 in accordance with a communication standard for the wireless LAN such as IEEE 802.11n. With this configuration, the wireless communication portion 17 can execute a data communication with the electronic devices 20 connected to the communication network 40, via the communication network 40 to which the wireless communication portion 17 is connected via the wireless relay device 30.

In addition, the wireless communication portion 17 can execute a wireless data communication with the electronic devices 20 without via the communication network 40 to which the wireless communication portion 17 is connected via the wireless relay device 30. For example, the wireless communication portion 17 can execute a wireless communication with the electronic devices 20 in accordance with a communication standard, such as Wi-Fi Direct (registered trademark), for wireless LAN.

The storage portion 18 is a nonvolatile storage device. For example, the storage portion 18 is a storage device such as a flash memory, a SSD (Solid State Drive), or a HDD (Hard Disk Drive).

The storage portion 18 stores destination place information that indicates a destination place of the image processing apparatus 10. For example, there may be a case where a different description of paper size is displayed on the operation/display portion 16 depending on the region to which the image processing apparatus 10 is shipped. In the image processing apparatus 10, various settings are performed by using the destination place information stored in the storage portion 18, the various settings including the setting of the paper sizes displayed on the operation/display portion 16.

For example, the destination place information is stored in the storage portion 18 by a person in charge of production of the maker of the image processing apparatus 10, at the time of shipment of the image processing apparatus 10. It is noted that the destination place information may be input by a user operation on the operation/display portion 16 when the initial setting of the image processing apparatus 10 is performed, and may be stored in the storage portion 18, for example.

Meanwhile, depending on the laws of the country in which the image processing apparatus 10 is used, a transmission condition, such as the frequency or the radio wave field intensity, for the radio wave that is transmitted from the wireless communication portion 17 may be restricted. For example, IEEE 802.11n, a communication standard for the wireless LAN, defines that a radio wave frequency band ranging from 2.401 GHz to 2.495 GHz can be used for the communication, with 14 channels set in the frequency band. However, usable channels may be restricted depending on the country. For example, there is no restriction on the usable channels in Japan, while use of channels 12 to 14 is restricted in the U.S.A. In connection with this, there is known a communication device that can set the transmission condition for the radio wave transmitted from the communication device, based on positional information of the communication device obtained from a GPS satellite.

However, in a case where the positional information of the communication device is obtained by using the GPS, a receiver for receiving a signal from the GPS satellite is necessary. This makes the configuration of the image processing apparatus 10 complicate. On the other hand, as described below, it is possible for the image processing apparatus 10 according to the embodiment of the present invention to set, with a simple configuration, the transmission condition for the radio wave that is transmitted from the wireless communication portion 17.

Next, the electronic devices 50 are described. Each of the electronic devices 50 can execute a wireless communication with an external communication device such as another electronic device 50. For example, in the communication system 100, a wireless communication network is formed as each of the plurality of electronic devices 50 executes a wireless communication.

Here, the electronic devices 50 can each transmit, to outside, country information that is registered in advance. For example, each electronic device 50 includes a storage device (not shown) that stores attribute information of the electronic device 50. The country information is stored in the storage device in advance as a part of the attribute information, by a person in charge of production of the maker of the image processing apparatus 10. This allows the country information to be registered in the electronic device 50. It is noted that the attribute information includes the identification information of the electronic device 50 and the positional information of the electronic device 50, as well as the country information.

For example, the electronic device 50 generates packet data that has a header including the attribute information, and executes a data communication with an external communication device such as another electronic device 50, by using the generated packet data. Here, the electronic device 50 is an example of the specific electronic device of the present invention. It is noted that, in response to an obtainment request requesting the attribute information and received from an external communication device, the electronic devices 50 may transmit the attribute information to a transmission source of the obtainment request.

Specifically, each of the electronic devices 50 is a so-called smart meter. The electronic device 50 (namely, a smart meter) is configured to measure the power consumption in the facility in which the smart meter is installed, and transmit the packet data including the measured power consumption to another electronic device 50. The packet data transmitted from the electronic device 50 is transmitted to the power company via the communication network. For example, the attribute information included in the header of the packet data is used in the power company for the customer management or the like. It is noted that the electronic device 50 may be a television, a telephone or the like as far as it has the transmission function provided in the smart meter.

On the other hand, a transmission condition setting program is stored in the ROM of the image processing apparatus 10 in advance, wherein the transmission condition setting program causes the CPU to execute a transmission condition setting process (see the flowchart of FIG. 3) that is described below. It is noted that the transmission condition setting program may be recorded on a computer-readable recording medium such as a CD, a DVD, or a flash memory, and may be installed from the recording medium to the storage portion 18.

As shown in FIG. 1, the control portion 15 includes a connection processing portion 151, an obtainment processing portion 152, and a setting processing portion 153. Specifically, the control portion 15 executes the transmission condition setting program stored in the ROM by using the CPU. This allows the control portion 15 to function as the connection processing portion 151, the obtainment processing portion 152, and the setting processing portion 153.

The connection processing portion 151 establishes a communication connection with the electronic device 50 by using a specific radio wave for which a transmission condition is set in advance. For example, the transmission condition is a frequency. Specifically, the specific radio wave is a radio wave that is transmitted at a frequency that is usable in a plurality of countries in common. For example, the specific radio wave is in a frequency band ranging from channel 1 to channel 11 that are usable in a plurality of countries including Japan and the U.S.A, among radio wave frequency bands that are used for communication in accordance with IEEE 802.11n that is a communication standard for the wireless LAN. It is noted that the transmission condition may be the radio wave field intensity, or may include both the frequency and the radio wave field intensity. In addition, the transmission condition may include a frequency modulation system.

For example, in the image processing apparatus 10, first setting information is stored in the ROM of the control portion 15 in advance, wherein the first setting information indicates the frequency of the specific radio wave. The connection processing portion 151 reads the first setting information from the ROM, and sets the frequency of the radio wave that is transmitted from the wireless communication portion 17, based on the read first setting information.

The connection processing portion 151 causes the wireless communication portion 17 to transmit a radio wave (the specific radio wave) at the frequency that was set based on the first setting information, and transmits a communication connection request to the electronic devices 50 that are present around the image processing apparatus 10. Upon receiving the connection request, each of the electronic devices 50 transmits a connection permission or a connection non-permission to the image processing apparatus 10. Upon receiving the connection permission, the connection processing portion 151 transmits a response indicating that the connection permission was received, to the electronic device 50 that transmitted the connection permission. This establishes a communication connection between the image processing apparatus 10 and the electronic device 50.

The obtainment processing portion 152 obtains the country information from the electronic device 50 with which a communication connection has been established by the connection processing portion 151. For example, the obtainment processing portion 152 analyzes the header of the packet data transmitted from the electronic device 50 with which a communication connection has been established by the connection processing portion 151, and obtains the country information included in the header. It is noted that the obtainment processing portion 152 may analyze the header of the packet data that is transmitted from an electronic device 50 when the connection processing portion 151 establishes a communication connection with the electronic device 50, and obtain the country information included in the header. In addition, the obtainment processing portion 152 may transmit an obtainment request to the electronic device 50 with which the communication connection has been established by the connection processing portion 151, and receive the attribute information that is transmitted from the electronic device 50 in response to the obtainment request, and obtain the country information included in the attribute information.

The setting processing portion 153 sets the transmission condition for the radio wave that is transmitted from the wireless communication portion 17, based on the country information obtained by the obtainment processing portion 152.

For example, in the image processing apparatus 10, second setting information is stored in the ROM of the control portion 15 in advance, the second setting information corresponding to the countries indicated in the country information. Specifically, the second setting information indicates a frequency at which radio waves can be transmitted in the corresponding country. The setting processing portion 153 refers to the country information obtained by the obtainment processing portion 152, and obtains from the ROM the second setting information that corresponds to the country information. In addition, the setting processing portion 153 sets the frequency of the radio wave that is transmitted from the wireless communication portion 17, based on the second setting information obtained from the ROM.

In addition, in a case where a communication connection is not established with any of the electronic devices 50 by the connection processing portion 151, the setting processing portion 153 sets the transmission condition for the radio wave that is transmitted from the wireless communication portion 17, based on the destination place information stored in the storage portion 18. For example, in a case where a response is not received from any of the electronic devices 50 before a predetermined time elapses since a transmission of the connection request by the connection processing portion 151, the setting processing portion 153 sets the transmission condition based on the destination place information.

For example, in the image processing apparatus 10, third setting information is stored in the ROM of the control portion 15 in advance, the third setting information corresponding to the regions indicated in the destination place information. Specifically, the third setting information indicates a frequency at which radio waves can be transmitted in the corresponding region. For example, in a case where a region indicated in the destination place information includes a plurality of countries, the third setting information indicates a frequency at which radio waves can be transmitted in common in the plurality of countries included in the corresponding region. In a case where a communication connection is not established with any of the electronic devices 50 by the connection processing portion 151, the setting processing portion 153 obtains the destination place information from the storage portion 18. Subsequently, the setting processing portion 153 refers to the destination place information obtained from the storage portion 18, and obtains from the ROM the third setting information that corresponds to the destination place information. The setting processing portion 153 then sets the frequency of the radio wave that is transmitted from the wireless communication portion 17, based on the third setting information obtained from the ROM.

[Transmission Condition Setting Process]

Figure 3:
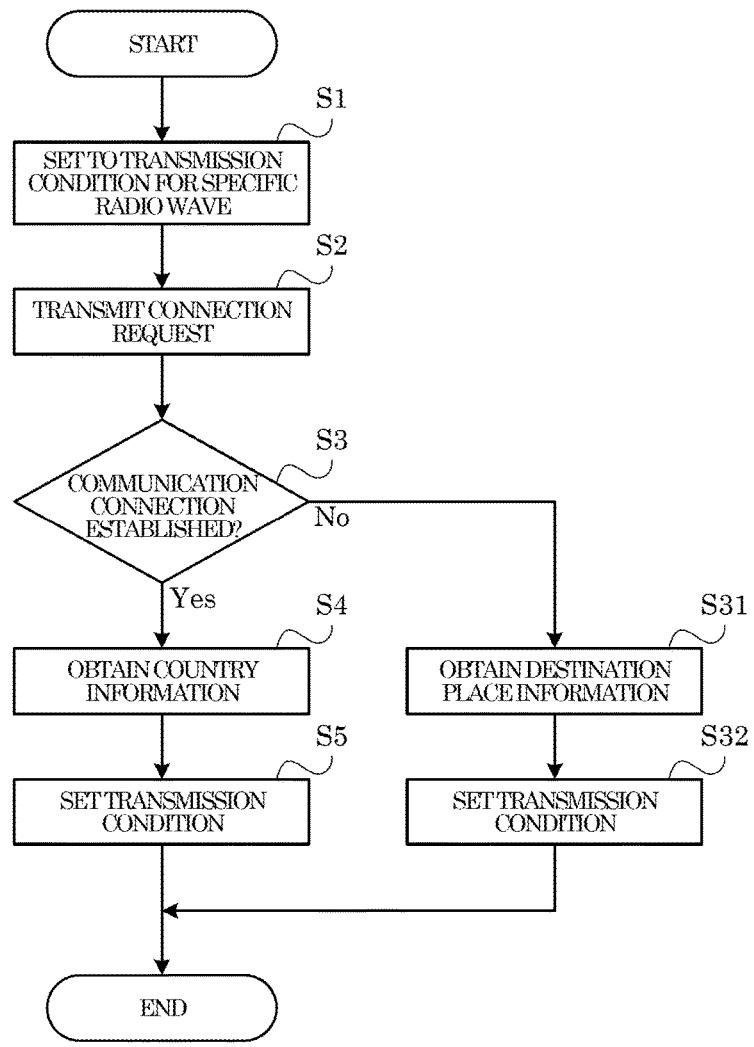
FIG. 3 is a flowchart showing an example of a transmission condition setting process executed by the image processing apparatus according to the embodiment of the present invention.

In the following, with reference to FIG. 3, a description is given of an example of the procedure of the transmission condition setting process executed by the control portion 15 in the image forming apparatus 10, and the radio wave setting method of the present invention. Here, steps S1, S2, . . . represent numbers assigned to the processing procedures (steps) executed by the control portion 15. For example, when the image processing apparatus 10 is powered on, the control portion 15 executes the transmission condition setting process. It is noted that the control portion 15 may execute the transmission condition setting process in response to a user operation performed on the operation/display portion 16.

<Step S1>

First, in step S1, the control portion 15 sets the transmission condition for the radio wave that is transmitted from the wireless communication portion 17, to the transmission condition for the specific radio wave. For example, the control portion 15 reads the first setting information from the ROM, and sets the transmission condition for the radio wave that is transmitted from the wireless communication portion 17, based on the read first setting information.

<Step S2>

In step S2, the control portion 15 causes the wireless communication portion 17 to transmit a radio wave (the specific radio wave) of a frequency that was set based on the first setting information, and transmits a connection request to the electronic devices 50 that are present around the image processing apparatus 10.

<Step S3>

In step S3, the control portion 15 determines whether or not a communication connection has been established with any of the electronic devices 50. For example, in a case where a connection permission is received from an electronic device 50 before a predetermined time elapses since a transmission of the connection request in step S2, and further a response indicating reception of the connection permission is transmitted to the electronic device 50, the control portion 15 determines that the communication connection has been established with the electronic device 50. Here, a series of processes in steps S1 to S3 until the communication connection is established with the electronic device 50 are an example of the first step of the present invention, and are executed by the connection processing portion 151 of the control portion 15.

Here, upon determining that the communication connection has been established with the electronic device 50 (Yes side at S3), the control portion 15 moves the process to step S4. In addition, upon determining that the communication connection has not been established with the electronic device 50 (No side at S3), the control portion 15 moves the process to step S31.

<Step S4>

In step S4, the control portion 15 analyzes the header of the packet data transmitted from the electronic device 50 with which the communication connection was established in step S3, and obtains the country information included in the header. Here, the process of step S4 is an example of the second step of the present invention, and is executed by the obtainment processing portion 152 of the control portion 15.

<Step S5>

In step S5, the control portion 15 sets the transmission condition for the radio wave that is transmitted from the wireless communication portion 17, based on the country information obtained in step S4. Here, the process of step S5 is an example of the third step of the present invention, and is executed by the setting processing portion 153 of the control portion 15.

For example, the control portion 15 refers to the country information obtained in step S4, and obtains from the ROM the second setting information based on the country information. The control portion 15 then sets the frequency of the radio wave that is transmitted from the wireless communication portion 17, based on the third setting information obtained from the ROM. This allows the frequency of the radio wave that is transmitted from the wireless communication portion 17, to be set to a frequency that is subject to the restriction of the country in which the image processing apparatus 10 is installed.

It is noted that the control portion 15 may transmit the country information obtained in step S4, to another image processing apparatus 10 or the like. In this case, the image processing apparatus 10 is also included in the specific electronic device of the present invention.

<Step S31>

On the other hand, upon determining in step S3 that the communication connection has not been established with the electronic devices 50, the control portion 15 executes the process of step S31. In step S31, the control portion 15 obtains the destination place information from the storage portion 18.

<Step S32>

In step S32, the control portion 15 sets the transmission condition for the radio wave that is transmitted from the wireless communication portion 17, based on the destination place information obtained in step S31. Here, the processes of steps S31 and S32 are executed by the setting processing portion 153 of the control portion 15.

For example, the control portion 15 refers to the destination place information obtained in step S31, and obtains from the ROM the third setting information that corresponds to the destination place information. The control portion 15 then sets the frequency of the radio wave that is transmitted from the wireless communication portion 17, based on the third setting information obtained from the ROM. This allows the frequency of the radio wave that is transmitted from the wireless communication portion 17, to be set to a frequency that is subject to the restriction of the region in which the image processing apparatus 10 is installed.

It is noted that, in a case where the region indicated in the destination place information includes a plurality of countries, the frequency indicated in the third setting information stored in the ROM in correspondence with the destination place information, can be used in common in the plurality of countries included in the region indicated in the destination place information. As a result, in a case where the frequency of the radio wave that is transmitted from the wireless communication portion 17 is set based on the destination place information, the frequency to be set may be restricted in range, compared to a case where the frequency is set based on the country information. As a result, in the transmission condition setting process, when the country information is not obtained from any of the electronic devices 50, the frequency of the radio wave that is transmitted from the wireless communication portion 17 is set based on the destination place information.

As described above, in the transmission condition setting process, the country information is obtained from the electronic devices 50, and the transmission condition for the radio wave that is transmitted from the wireless communication portion 17 is set based on the obtained country information. This makes it possible to set, with a simple configuration, the transmission condition for the radio wave that is transmitted from the wireless communication portion 17.

The invention claimed is:

1. An electronic device comprising:
a storage portion storing destination place information that indicates a destination place of the electronic device; and
a communication device, wherein
the communication device includes:
a connection processing portion configured to establish a communication connection with a specific electronic device by using a specific radio wave for which a frequency is determined in advance, the specific electronic device being capable of transmitting, to outside, country information that is registered in advance;
an obtainment processing portion configured to obtain the country information from the specific electronic device with which the communication connection has been established by the connection processing portion;
a setting processing portion configured to set, based on the country information obtained by the obtainment processing portion, a frequency of a radio wave that is transmitted from the communication device, to a frequency at which radio waves can be transmitted in a country indicated in the country information; and
a ROM storing third setting information that corresponds to regions indicated in the destination place information, and indicates a frequency at which radio waves can be transmitted in common in a plurality of countries included in the region, wherein
in a case where a communication connection is not established with the specific electronic device by the connection processing portion and thus the country information has failed to be obtained from the specific electronic device, the setting processing portion obtains the destination place information from the storage portion, refers to the obtained destination place information, and obtains from the ROM the third setting information that corresponds to the destination place information, and sets the frequency of the radio wave that is transmitted from the communication device, based on the obtained third setting information.

2. The electronic device according to claim 1, wherein the specific electronic device includes a smart meter.

3. The electronic device according to claim 1, comprising:
either one or both of an image reading portion and an image forming portion, the image reading portion being configured to read image data from a document sheet, the image forming portion being configured to form an image based on image data.

4. A radio wave setting method executed in an electronic device that includes:
a storage portion storing destination place information that indicates a destination place of the electronic device; and a communication device that includes a ROM storing third setting information that corresponds to regions indicated in the destination place information, and indicates a frequency at which radio waves can be transmitted in common in a plurality of countries included in the region, the radio wave setting method comprising:
a first step of establishing a communication connection with a specific electronic device by using a specific radio wave for which a frequency is determined in advance, the specific electronic device being capable of transmitting, to outside, country information that is registered in advance;
a second step of obtaining the country information from the specific electronic device with which the communication connection has been established in the first step;
a third step of setting, based on the country information obtained in the second step, a frequency of a radio wave that is transmitted from the communication device, to a frequency at which radio waves can be transmitted in a country indicated in the country information; and a step of, in a case where a communication connection is not established with the specific electronic device in the first step and thus the country information has failed to be obtained from the specific electronic device, obtaining the destination place information from the storage portion, referring to the obtained destination place information, and obtaining from the ROM the third setting information that corresponds to the destination place information, and setting the frequency of the radio wave that is transmitted from the communication device, based on the obtained third setting information.

* * * * *